United States Patent
Terry et al.

(10) Patent No.: US 9,173,204 B2
(45) Date of Patent: *Oct. 27, 2015

(54) WIRELESS COMMUNICATION METHOD AND SYSTEM FOR CONFIGURING RADIO ACCESS BEARERS FOR ENHANCED UPLINK SERVICES

(71) Applicant: InterDigital Technology Corporation, Wilmington, DE (US)

(72) Inventors: Stephen E. Terry, Northport, NY (US); Guodong Zhang, Syosset, NY (US); James M. Miller, Verona, NJ (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/725,504

(22) Filed: Dec. 21, 2012

(65) Prior Publication Data
US 2013/0107847 A1    May 2, 2013

Related U.S. Application Data

(63) Continuation of application No. 11/115,999, filed on Apr. 27, 2005, now Pat. No. 8,345,644.

(60) Provisional application No. 60/566,458, filed on Apr. 29, 2004.

(51) Int. Cl.
*H04W 4/00*        (2009.01)
*H04W 72/04*       (2009.01)
(Continued)

(52) U.S. Cl.
CPC .......... *H04W 72/0406* (2013.01); *H04W 28/18* (2013.01); *H04W 52/48* (2013.01);
(Continued)

(58) Field of Classification Search
CPC ..... H04W 28/18; H04W 52/20; H04W 52/48; H04W 72/00; H04W 72/0406; H04W 72/085; H04W 88/12
USPC ......... 370/338, 328, 310, 469, 329, 345, 235, 370/315, 342, 394, 278
See application file for complete search history.

(56) References Cited

U.S. PATENT DOCUMENTS

| 5,668,600 A | 9/1997 | Lee |
| 5,751,362 A | 5/1998 | Lee |

(Continued)

OTHER PUBLICATIONS

3GPP TS 25.430 v3.8.0 (Jun. 2002); 3rd Generation Partnership Project; Technical Specification Group Radio Access Network; UTRAN Iub Interface: General Aspects and Principles (Release 1999).*

(Continued)

*Primary Examiner* — Khai M Nguyen
(74) *Attorney, Agent, or Firm* — Volpe and Koenig, P.C.

(57) ABSTRACT

A wireless communication method and system for controlling an enhanced uplink (EU) radio access bearer (RAB). The wireless communication system includes at least one wireless transmit/receive unit (WTRU), at least one Node-B and a radio network controller (RNC). The RNC configures an EU RAB to operate on an enhanced dedicated channel (E-DCH). At least one of the WTRU and the Node-B report EU traffic statistics and EU performance statistics to the RNC. The RNC then adjusts the configuration of the EU RAB in accordance with the received EU traffic statistics, the EU performance statistics, and information collected by the RNC itself.

18 Claims, 1 Drawing Sheet

(51) Int. Cl.

| | |
|---|---|
| *H04W 28/18* | (2009.01) |
| *H04W 52/48* | (2009.01) |
| *H04W 52/50* | (2009.01) |
| *H04W 72/08* | (2009.01) |
| *H04W 52/20* | (2009.01) |
| *H04W 84/04* | (2009.01) |
| *H04W 88/12* | (2009.01) |

(52) U.S. Cl.
CPC .......... *H04W 52/50* (2013.01); *H04W 72/085* (2013.01); *H04W 52/20* (2013.01); *H04W 84/042* (2013.01); *H04W 88/12* (2013.01)

(56) References Cited

U.S. PATENT DOCUMENTS

| | | | |
|---|---|---|---|
| 5,991,618 | A | 11/1999 | Hall |
| 6,272,340 | B1 | 8/2001 | Wright et al. |
| 6,285,665 | B1 | 9/2001 | Chuah |
| 6,594,782 | B1 | 7/2003 | Tagawa |
| 6,640,105 | B1 | 10/2003 | Shin |
| 6,675,016 | B2 | 1/2004 | Lucidarme et al. |
| 7,406,314 | B2 | 7/2008 | Sharma |
| 7,509,127 | B2 | 3/2009 | Wang et al. |
| 2002/0118661 | A1* | 8/2002 | Voce ............................. 370/337 |
| 2002/0193118 | A1 | 12/2002 | Jain et al. |
| 2003/0086389 | A1 | 5/2003 | Hayashi et al. |
| 2003/0210668 | A1 | 11/2003 | Malladi et al. |
| 2003/0210669 | A1 | 11/2003 | Vayanos et al. |
| 2003/0236103 | A1 | 12/2003 | Tamaki et al. |
| 2004/0001472 | A1 | 1/2004 | Kwak et al. |
| 2004/0015750 | A1 | 1/2004 | Obuchi et al. |
| 2004/0037224 | A1 | 2/2004 | Choi et al. |
| 2004/0085934 | A1 | 5/2004 | Balachandran et al. |
| 2004/0085936 | A1 | 5/2004 | Gopalakrishnan et al. |
| 2004/0185892 | A1 | 9/2004 | Iacono et al. |
| 2004/0192308 | A1 | 9/2004 | Lee et al. |
| 2005/0041694 | A1 | 2/2005 | Liu |
| 2005/0048920 | A1 | 3/2005 | Liu |
| 2005/0068990 | A1 | 3/2005 | Liu |
| 2005/0107106 | A1 | 5/2005 | Valkealahti et al. |
| 2005/0111358 | A1 | 5/2005 | Hsu et al. |
| 2005/0207359 | A1* | 9/2005 | Hwang et al. .................. 370/278 |
| 2005/0249138 | A1* | 11/2005 | Heo et al. ....................... 370/311 |
| 2005/0250500 | A1 | 11/2005 | Xu |
| 2005/0250511 | A1 | 11/2005 | Xiao et al. |
| 2006/0209869 | A1 | 9/2006 | Kim et al. |
| 2006/0234638 | A1 | 10/2006 | Mueckenheim et al. |
| 2007/0008990 | A1 | 1/2007 | Torsner |
| 2007/0105527 | A1 | 5/2007 | Nylander et al. |
| 2013/0215830 | A1* | 8/2013 | Lohr et al. ...................... 370/328 |

OTHER PUBLICATIONS

3GPP TSG-RAN WG2 Meeting #42, May 10-14, 2004 in Montreal, Canada; source: Panasonic; Title: HSUPA MAC architecture; Agenda Item : 10.2.2.*

3GPP TSG-Ran WG2 Meeting # 42 (May 10-14, 2004 in Montreal, canada), Panasonic, HSUPA MAC architecture.*

Third Generation Partnership Project Two, "Medium Access Control (MAC) Standard for cdma2000 Spread Spectrum Systems", 3GPP2 C.S0003-C, Version 2.0, Release C, Aug. 2004, Group TSG-C.

Third Generation Partnership Project Two, "Physical Layer Standard for cdma2000 Spread Spectrum Systems", 3GPP2 C.S0002-C, Version 2.0, Revision C, Jul. 23, 2004, Group TSG-C.

Third Generation Partnership Project Two, "Signaling Link Access Control (LAC) Standard for cdma2000 Spread Spectrum Systems", 3GPP2 C.S0004-C, Version 2.0, Revision C, Jul. 23, 2004, Group TSG-C.

Third Generation Partnership Project Two, "Upper Layer (Layer 3) Signaling Standard for cdma2000 Spread Spectrum Systems", 3GPP2 C.S0005-C, Version 2.0, Revision c, Jul. 23, 2004, Group TSG-C.

Third Generation Partnership Project; Technical Specification Group Radio Access Network; Medium Access Control (MAC) Protocol Specification (Release 1999), 3GPP TS 25.321 V 3.16.0 (Sep. 2003).

Third Generation Partnership Project; Technical Specification Group Radio Access Network; Medium Access Control (MAC) Protocol Specification (Release 1999), 3GPP TS 25.321 V 3.17.0 (Jun. 2004).

Third Generation Partnership Project; Technical Specification Group Radio Access Network; Medium Access Control (MAC) Protocol Specification (Release 4), 3GPP TS 25.321 V 4.9.0 (Sep. 2003).

Third Generation Partnership Project; Technical Specification Group Radio Access Network; Medium Access Control (MAC) Protocol Specification (Release 4), 3GPP TS 25.321 V 4.10.0 (Jun. 2004).

Third Generation Partnership Project; Technical Specification Group Radio Access Network; Medium Access Control (MAC) Protocol Specification (Release 5), 3GPP TS 25.321 V 5.8.0 (Mar. 2004).

Third Generation Partnership Project; Technical Specification Group Radio Access Network; Medium Access Control (MAC) Protocol Specification (Release 5), 3GPP TS 25.321 V 5.10.0 (Dec. 2004).

Third Generation Partnership Project; Technical Specification Group Radio Access Network; Medium Access Control (MAC) Protocol Specification (Release 6), 3GPP TS 25.321 V 6.1.0 (Mar. 2004).

Third Generation Partnership Project; Technical Specification Group Radio Access Network; Medium Access Control (MAC) Protocol Specification (Release 6), 3GPP TS 25.321 V 6.4.0 (Mar. 2005).

Third Generation Partnership Project; Technical Specification Group Radio Access Network; Feasibility Study for Enhanced Uplink for UTRA FDD (Release 6), 3GPP TR 25.896 V6.0.0 (Mar. 2004).

Third Generation Partnership Project; Technical Specification Group Radio Access Network; FDD Enhanced Uplink; Overall Description; Stage 2 (Release 6), 3GPP TS 25.309 V6.2.0 (Mar. 2005).

Third Generation Partnership Project; Technical Specification Group Radio Access Network; Physical channels and mapping of transport channels onto physical channels (FDD) (Release 1999), 3GPP TS 25.211 V3.12.0 (Sep. 2002).

Third Generation Partnership Project; Technical Specification Group Radio Access Network; Physical channels and mapping of transport channels onto physical channels (FDD) (Release 4), 3GPP TS 25.211 V4.6.0 (Sep. 2002).

Third Generation Partnership Project; Technical Specification Group Radio Access Network; Physical channels and mapping of transport channels onto physical channels (FDD) (Release 5), 3GPP TS 25.211 V5.5.0 (Sep. 2003).

Third Generation Partnership Project; Technical Specification Group Radio Access Network; Physical channels and mapping of transport channels onto physical channels (FDD) (Release 5), 3GPP TS 25.211 V5.6.0 (Sep. 2004).

Third Generation Partnership Project; Technical Specification Group Radio Access Network; Physical channels and mapping of transport channels onto physical channels (FDD) (Release 6), 3GPP TS 25.211 V6.0.0 (Dec. 2003).

Third Generation Partnership Project; Technical Specification Group Radio Access Network; Physical channels and mapping of transport channels onto physical channels (FDD) (Release 6), 3GPP TS 25.211 V6.4.0 (Mar. 2005).

Third Generation Partnership Project; Technical Specification Group Radio Access Network; Requirements for support of radio resource management (FDD) (Release 1999), 3GPP TS 25.133 V3.17.0 (Mar. 2004).

Third Generation Partnership Project; Technical Specification Group Radio Access Network; Requirements for support of radio resource management (FDD) (Release 1999), 3GPP TS 25.133 V3.20.0 (Mar. 2005).

Third Generation Partnership Project; Technical Specification Group Radio Access Network; Requirements for support of radio resource management (FDD) (Release 4), 3GPP TS 25.133 V4.12.0 (Mar. 2004).

Third Generation Partnership Project; Technical Specification Group Radio Access Network; Requirements for support of radio resource management (FDD) (Release 4), 3GPP TS 25.133 V4.14.0 (Mar. 2005).

(56) References Cited

OTHER PUBLICATIONS

Third Generation Partnership Project; Technical Specification Group Radio Access Network; Requirements for support of radio resource management (FDD) (Release 5), 3GPP TS 25.133 V5.10.0 (Mar. 2004).

Third Generation Partnership Project; Technical Specification Group Radio Access Network; Requirements for support of radio resource management (FDD) (Release 5), 3GPP TS 25.133 V5.14.0 (Mar. 2005).

Third Generation Partnership Project; Technical Specification Group Radio Access Network; Requirements for support of radio resource management (FDD) (Release 6), 3GPP TS 25.133 V6.5.0 (Mar. 2004).

Third Generation Partnership Project; Technical Specification Group Radio Access Network; Requirements for support of radio resource management (FDD) (Release 6), 3GPP TS 25.133 V6.9.0 (Mar. 2005).

Third Generation Partnership Project; Technical Specification Group Radio Access Network; Radio Resource Control (RRC) protocol specification (Release 1999), 3GPP TS 25.331 V3.18.0 (Mar. 2004).

Third Generation Partnership Project; Technical Specification Group Radio Access Network; Radio Resource Control (RRC) protocol specification (Release 1999), 3GPP TS 25.331 V3.21.0 (Dec. 2004).

Third Generation Partnership Project; Technical Specification Group Radio Access Network; Radio Resource Control (RRC); Protocol Specification (Release 4), 3GPP TS 25.331 V4.13.0 (Mar. 2004).

Third Generation Partnership Project; Technical Specification Group Radio Access Network; Radio Resource Control (RRC); Protocol Specification (Release 4), 3GPP TS 25.331 V4.17.0 (Mar. 2005).

Third Generation Partnership Project; Technical Specification Group Radio Access Network; Radio Resource Control (RRC); Protocol Specification (Release 5), 3GPP TS 25.331 V5.8.0 (Mar. 2004).

Third Generation Partnership Project; Technical Specification Group Radio Access Network; Radio Resource Control (RRC); Protocol Specification (Release 5), 3GPP TS 25.331 V5.12.1 (Mar. 2005).

Third Generation Partnership Project; Technical Specification Group Radio Access Network; Radio Resource Control (RRC); Protocol Specification (Release 6), 3GPP TS 25.331 V6.1.0 (Mar. 2004).

Third Generation Partnership Project; Technical Specification Group Radio Access Network; Radio Resource Control (RRC); Protocol Specification (Release 6), 3GPP TS 25.331 V6.5.0 (Mar. 2005).

Third Generation Partnership Project; Technical Specification Group Radio Access Network; UTRAN lub/lur interface user plane protocol for DCH data streams (Release 1999), 3GPP TS 25.427 V3.11.0 (Dec. 2003).

Third Generation Partnership Project; Technical Specification Group Radio Access Network; UTRAN lub/lur interface user plane protocol for DCH data streams (Release 4), 3GPP TS 25.427 V4.5.0 (Dec. 2003).

Third Generation Partnership Project; Technical Specification Group Radio Access Network; UTRAN lub/lur interface user plane protocol for DCH data streams (Release 5), 3GPP TS 25.427 V5.3.0 (Dec. 2003).

Third Generation Partnership Project; Technical Specification Group Radio Access Network; UTRAN lub/lur interface user plane protocol for DCH data streams (Release 5), 3GPP TS 25.427 V5.4.0 (Mar. 2005).

Third Generation Partnership Project; Technical Specification Group Radio Access Network; UTRAN lub interface NBAP signalling (Release 1999), 3GPP TS 25.433 V3.14.0 (Sep. 2003).

Third Generation Partnership Project; Technical Specification Group Radio Access Network; UTRAN lub interface NBAP signalling (Release 6), 3GPP TS 25.433 V6.5.0 (Mar. 2005).

Third Generation Partnership Project; Technical Specification Group Radio Access Network; UTRAN lub interface NBAP signalling (Release 6), 3GPP TS 25.433 V6.1.0 (Mar. 2004).

Third Generation Partnership Project; Technical Specification Group Radio Access Network; UTRAN lub/lur interface user plane protocol for DCH data streams (Release 6), 3GPP TS 25.427 V6.0.0 (Dec. 2003).

Third Generation Partnership Project; Technical Specification Group Radio Access Network; UTRAN lub/lur interface user plane protocol for DCH data streams (Release 6), 3GPP TS 25.427 V6.2.0 (Mar. 2005).

Third Generation Partnership Project; Technical Specification Group Radio Access Network; UTRAN lub interface NBAP signalling (Release 1999), 3GPP TS 25.433 V3.14.2 (Sep. 2004).

Third Generation Partnership Project; Technical Specification Group Radio Access Network; UTRAN lub interface NBAP signalling (Release 4), 3GPP TS 25.433 V4.12.0 (Mar. 2004).

Third Generation Partnership Project; Technical Specification Group Radio Access Network; UTRAN lub interface NBAP signalling (Release 4), 3GPP TS 25.433 V4.13.0 (Sep. 2004).

Third Generation Partnership Project; Technical Specification Group Radio Access Network; UTRAN lub interface NBAP signalling (Release 5), 3GPP TS 25.433 V5.8.0 (Mar. 2004).

Third Generation Partnership Project; Technical Specification Group Radio Access Network; UTRAN lub interface NBAP signalling (Release 5), 3GPP TS 25.433 V5.12.0 (Mar. 2005).

Third Generation Partnership Project; Technical Specification Group Radio Access Network; UTRAN lub Interface: General Aspects and Principles (Release 1999), 3GPP TS 25.430 V3.8.0 (Jun. 2002).

Third Generation Partnership Project; Technical Specification Group Radio Access Network; UTRAN lub interface: general aspects and principles (Release 4), 3GPP TS 25.430 V4.4.0 (Sep. 2002).

Third Generation Partnership Project; Technical Specification Group Radio Access Network; UTRAN lub interface: general aspects and principles (Release 5), 3GPP TS 25.430 V5.2.0 (Sep. 2002).

Third Generation Partnership Project; Technical Specification Group Radio Access Network; UTRAN lub interface: general aspects and principles (Release 5), 3GPP TS 25.430 V5.4.0 (Sep. 2004).

Third Generation Partnership Project; Technical Specification Group Radio Access Network; UTRAN lub interface: general aspects and principles (Release 6), 3GPP TS 25.430 V6.0.0 (Dec. 2003).

Third Generation Partnership Project; Technical Specification Group Radio Access Network; UTRAN lub interface: general aspects and principles (Release 6), 3GPP TS 25.430 V6.4.0 (Mar. 2005).

* cited by examiner

WIRELESS COMMUNICATION METHOD AND SYSTEM FOR CONFIGURING RADIO ACCESS BEARERS FOR ENHANCED UPLINK SERVICES

CROSS REFERENCE TO RELATED APPLICATIONS

This application is a continuation of U.S. patent application Ser. No. 11/115,999 filed on Apr. 27, 2005, which claims the benefit of U.S. Provisional Application No. 60/566,458 filed on Apr. 29, 2004, which is incorporated by reference herein as if fully set forth. This application is also related to U.S. patent application Ser. No. 11/116,073 filed on Apr. 27, 2005, which is incorporated by reference herein as if fully set forth.

FIELD OF INVENTION

The present invention is related to a wireless communication system including at least one wireless transmit/receive unit (WTRU), a least one Node-B and a radio network controller (RNC). More particularly, the present invention is a method and system for configuring enhanced uplink (EU) radio access bearers (RABs) for supporting EU services in the wireless communication system.

BACKGROUND

Methods for improving uplink (UL) coverage, throughput and transmission latency are currently being investigated in the 3rd generation partnership project (3GPP). In order to achieve these goals, control, (i.e., scheduling and assigning), of UL resources, (i.e., physical channels), will be moved from the RNC to the Node-B.

The Node-B can make decisions and manage uplink radio resources on a short-term basis more efficiently than the RNC. However, the RNC should retain coarse overall control of the EU RAB in terms of an allowed transport format combination set (TFCS), maximum allowed transmit power, or the like.

SUMMARY

The present invention is related to a wireless communication method and system for controlling an EU RAB. The wireless communication system includes at least one WTRU, at least one Node-B and an RNC. The RNC configures an EU RAB to operate on an enhanced dedicated channel (E-DCH). At least one of the WTRU and the Node-B report EU traffic statistics and EU performance statistics to the RNC. The RNC then adjusts the configuration of the EU RAB in accordance with the received EU traffic statistics and the EU performance statistics.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
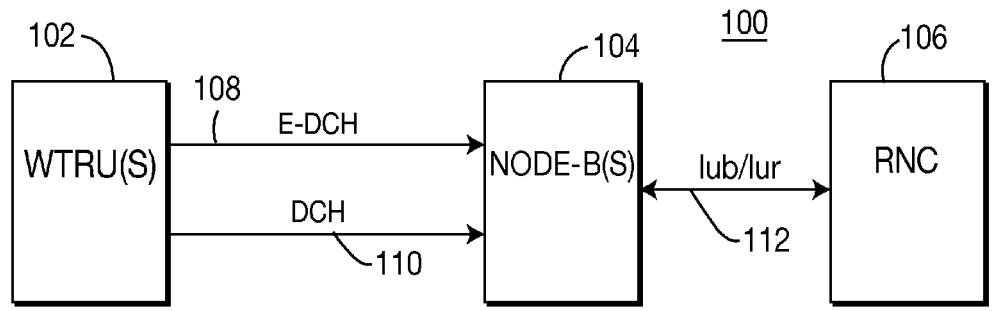
FIG. 1 is a block diagram of a wireless communication system configured in accordance with the present invention.

FIG. 1 is a block diagram of a wireless communication system 100 configured in accordance with the present invention. The system 100 includes at least one WTRU 102, at least one Node-B 104 and an RNC 106. An E-DCH 108, (along with associated signaling channels), is established between the WTRU 102 and the Node-B 104, in addition to a regular dedicated channel (DCH) 110. Of course, those of skill in the art would understand that FIG. 1 does not depict all of the signaling, such as any downlink (DL) channels, between the WTRU 102 and the Node-B 104 that is not specifically relevant to the present invention.

The RNC 106 retains overall control of EU RAB via an Iub/Iur interface 112. By properly setting the EU RAB parameters, the RNC 106 can keep coarse control of the EU RAB and radio resources will be efficiently utilized for both regular DCHs 110 and E-DCHs 108. The RNC 106 controls the EU RAB without closely monitoring EU transmissions from the WTRU 102 to the Node-B 104 sent over an E-DCH 108 on a transmission time interval (TTI) basis.

When the RAB is configured to transfer E-DCH data, the RNC 106 establishes configuration of EU services for the RAB by establishing WTRU configuration requirements. The initial configuration for each WTRU 102 supporting the EU services may include, but is not limited to, at least one of an allowed transport format combination set (TFCS) for E-DCH, allowed modulation and coding schemes (MCSs) for E-DCH, a maximum allowed E-DCH transmit power and a maximum allowed WTRU transmit power. The maximum allowed WTRU transmit power limits the sum of transmit power on a regular DCH, an E-DCH, an uplink signaling channel for high speed downlink packet access (HSDPA) and an uplink signaling channel for E-DCH.

The RAB may be configured using at least one of a channel allocation request response timer, (which defines a time limit for a Node-B to provide an E-DCH allocation information before the WTRU generates another periodic channel allocation request), a block error rate (BLER) of an E-DCH transport channel (TrCH), a signal-to-interference ratio (SIR) of the E-DCH TrCH, mapping of medium access control for DCH (MAC-d) flows to an E-DCH TrCH, a maximum number of automatic repeat request (ARQ) retransmissions (preferably per MAC-d flow), a maximum number of hybrid-ARQ (H-ARQ) retransmissions, and a data lifespan timer, (defining a time limit for expiration of transmission of the E-DCH data), within a WTRU MAC for EU (MAC-e) and a physical layer for EU (PHY-e) for each TrCH. The WTRU MAC-e may discard the E-DCH data when the maximum number of H-ARQ retransmissions is exceeded or when the lifespan timer expires.

Initially, the allowed TFCS and MCSs for E-DCH are configured by considering at least one of the current load of regular DCH traffic in the UL of a cell, current load of EU traffic in a cell, and information of the WTRU 102 to be configured for EU services. The current load of regular DCH traffic in the uplink of a cell is determined by at least one of resource usage, average transmit power, average interference, a required energy per bit to noise ratio, a data rate, and an activity factor. The current load of EU traffic in a cell is determined by at least one of resource usage, average transmit power, average interference, possible MCS, average probability that each MCS is applied, a required energy per bit to noise ratio of each MCS, possible TFCs and average probability that each TFC may be applied, and an activity factor. Information of the WTRU 102 to be configured for EU services includes information of its current regular DCH, (a data rate, a required energy per bit to noise ratio and an activity factor on regular DCH), and information of expected E-DCH, (expected data rate of the EU services, QoS (such as block error rate), activity factor, or the like.

The maximum allowed transmit power of the WTRU 102 should be configured because EU service is added to the RAB that currently has regular DCHs. The maximum allowed E-DCH transmit power and maximum allowed WTRU transmit power are determined by considering the same factors for the allowed TFCS and MCS with some additional factors, such as current maximum allowed WTRU transmit power configured by the RNC 106, and the number of events that maximum transmit power is reached.

Parameters such as maximum number of H-ARQ/ARQ retransmissions, a lifespan timer, or the like, are determined based on the QoS of RABs mapped to the MAC-d flow. The maximum H-ARQ retransmissions and WTRU MAC-e transmission lifespan are determined by considering maximum allowed transmission latency and BLER requirements to maintain QoS. MAC-d flows occur between logical channels and transport channels of the WTRU 102, which are used to establish the parameters of the EU RAB.

Each MAC-d flow has unique configurable parameters that relate to a required QoS for the RABs. The WTRU 102 and the Node-B 104 may be configured by the RNC 106 to multiplex a plurality of MAC-d flows on an E-DCH TrCH. Scheduling priority may be given to one MAC-d flow over another MAC-d flow. This may be accomplished by an absolute priority mechanism where transmission of higher priority data is always maximized. At least one of allowed transport formats (TFs), MCSs, transmit power, BLER, MAC for DCH (MAC-d) flow mapping, maximum number of H-ARQ/ARQ retransmissions and data lifespan parameters may be unique for each MAC-d flow.

Scheduled EU transmissions can only use TFCS and MCSs that are allowed in the configuration. The transmit power on E-DCH should not exceed the maximum allowed E-DCH transmit power configured by the RNC 106. The sum of transmit power on a regular DCH and an E-DCH should not exceed the maximum allowed WTRU transmit power configured.

The transmissions of the WTRU 102 on the E-DCH 108 are also subject to the constraint of the parameters configured for the E-DCH TrCH, (e.g., a lifespan timer, a maximum number of H-ARQ retransmissions, a number of ARQ retransmissions, or the like). If the maximum number of H-ARQ process transmissions or the transmission lifespan timer is exceeded, the WTRU MAC-e may discard the transmission and initiate service of the next transmission from higher layers.

Once the WTRU 102 starts to operate on the E-DCH 108, EU traffic statistics and performance statistics are reported to the RNC 106 for each MAC-d flow or TrCH mapped to the EU RAB. The EU traffic statistics include traffic volume measurement (TVM) of EU data stored in the WTRU 102, and volume of successful or unsuccessful EU data transmissions which occur over a predetermined time period. The EU performance statistics include at least one of resource utilization per cell, resource utilization per WTRU, an ACK/NACK ratio per cell, an ACK/NACK ratio per resource, an ACK/NACK ratio per WTRU, average number of transmissions that failed in the medium access control (MAC) layer, (or average number of transmissions that failed in the MAC layer), average channel quality indicator (CQI) results per cell, average CQI results per resource, average CQI per WTRU, best CQI results, worst CQI results, the number of events for which WTRU maximum transmit power is reached, the number events for which EU maximum transmit power of the WTRU is reached, the number of transmission failures due to hybrid-automatic repeat request (H-ARQ) process retransmission limit, and the number of transmission failures due to EU transmission lifespan timeout, EU traffic and performance statistics may be reported from the WTRU 102 and the Node-B 104 to the RNC 106. The report from the WTRU 102 may be relayed by the Node-B 104 to the RNC 106. The reporting can be periodic or threshold based. The periods or thresholds of reporting are set by the RNC 106 and are also design parameters.

In the case that EU traffic and performance statistics are reported only by the Node-B 104 to the RNC 106, the EU traffic and performance statistics that are collected by the WTRU 102 are reported to the Node-B 104 through a physical or MAC layer signaling. If EU traffic and performance statistics are forwarded to the Node-B 104 from the WTRU 102 using physical or MAC layer signaling, they can be collected and forwarded to the RNC 106 via the Iub/Iur interface 112.

Other measurement data known only to the Node-B 104 can also be sent to the RNC 106 to allow for the RNC 106 to control EU resources. This includes received code power on EU assigned codes reported on a WTRU or cell basis, interference received based on EU assigned codes, and an ACK/NACK ratio as perceived by the Node-B 104.

In addition to EU traffic and performance statistics and measurement reports sent to the RNC 106, the adjustment of configuration of EU services also depends on some information that are collected by the RNC 106 itself, which includes traffic and performance statistics of a regular DCH 110 and some EU performance statistics.

Upon receiving the reported EU traffic and performance statistics and measurement reports from the WTRU 102 and/or the Node-B 104, the RNC 106 adjusts configuration of the EU RAB, such as allowed TFs, MCSs, transmit power, BLER, MAC-d flow mapping, H-ARQ retransmission and data lifespan parameters for each MAC-d flow or TrCH according to the reported traffic and performance statistics. In this way, the RNC 106 keeps coarse control of the EU RAB.

Figure 2:
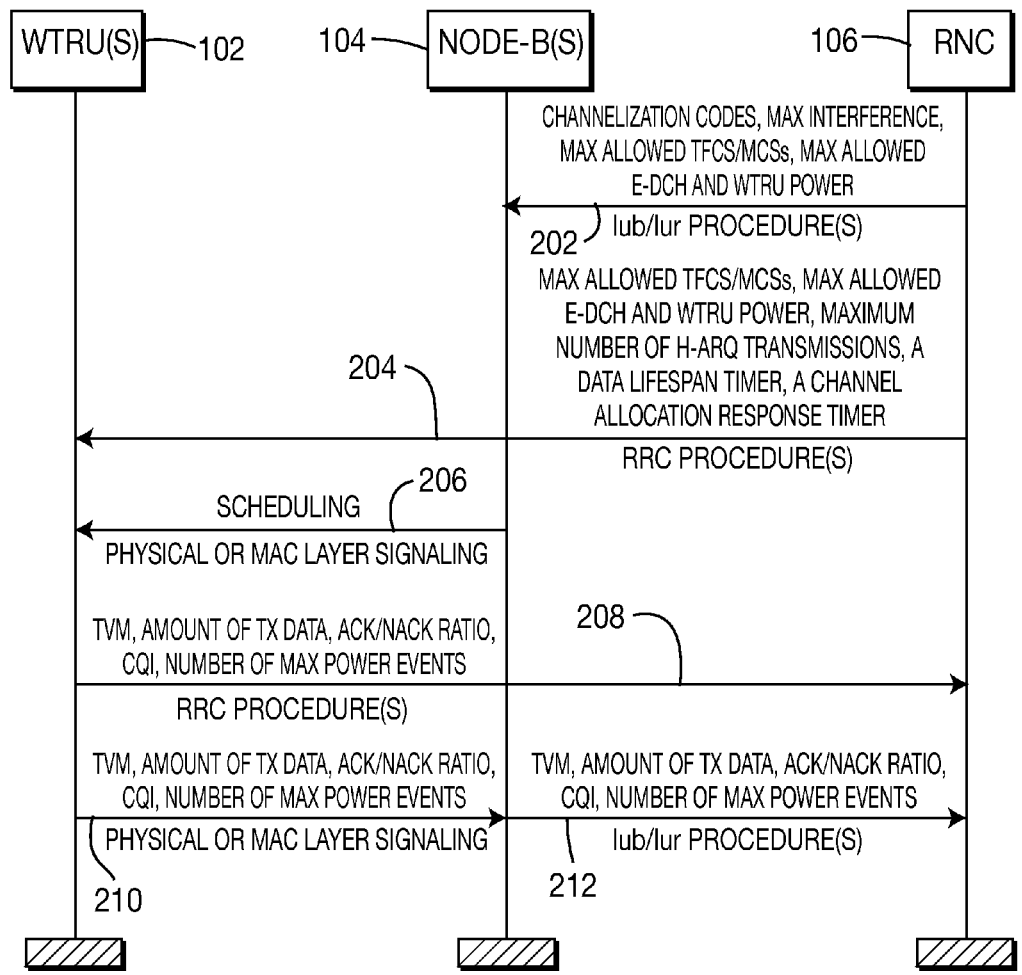
FIG. 2 is a signal diagram of a process implemented in the system of FIG. 1 for configuring an EU RAB.

FIG. 2 is a signal diagram of a process 200 implemented in the system 100 for configuring and reconfiguring EU RABs in accordance with the present invention. The method is implemented between at least one WTRU 102, at least one Node-B 104 and an RNC 106. The RNC 106 sends initial configuration parameters, (e.g., channelization codes, maximum interference, maximum allowed TFCS/MCSs, a maximum allowed E-DCH and WTRU power, or the like), for the Node-B 104 through the Iub/Iur interface 112 (step 202). The RNC 106 configures an EU RAB by system configuration parameters, (e.g., maximum allowed TFCS/MCSs, maximum allowed E-DCH and WTRU power, the maximum number of H-ARQ transmissions, a data lifespan timer, a channel allocation response timer for periodic channel allocation request generation, or the like), to the WTRU 102 through radio resource control (RRC) messages when the EU RAB is configured to operate on the E-DCH 108 (step 204). EU scheduling is performed by the Node-B 104 within the limits of the configuration set by the RNC 106 and transmitted by physical or MAC layer signaling (step 206). The WTRU 102 reports EU traffic and performance statistics, (e.g., TVM, amount of transmit (TX) data, an ACK/NACK ratio, a channel quality indicator (CQI), and the number of maximum power events, or the like), to the RNC 106 through RRC messages (step 208), or to the Node-B 104 by physical or MAC layer signaling (step 210) to be forwarded to the RNC 106 via the Iub/Iur interface 112 (step 212). The RNC 106 reconfigures the EU services and the EU RAB in accordance with the reported statistics (step 202).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for controlling enhanced uplink (EU) transmission, implemented by a Node B, comprising:
   receiving, by a Node B, configuration information from a radio network controller (RNC), the configuration information including a maximum number of retransmissions associated with each of a plurality of medium access control for dedicated channel (MAC-d) flows for an EU channel; and
   transmitting performance information to the RNC, the performance information indicating that the maximum number of retransmissions associated with one of the plurality of MAC-d flows is exceeded.

2. The method of claim 1 wherein the EU channel is an enhanced dedicated channel (E-DCH) between a wireless transmit/receive unit (WTRU) and the Node B.

3. A Node B for controlling enhanced uplink (EU) transmission comprising:
   circuitry configured to receive configuration information from a radio network controller (RNC), the configuration information including a maximum number of retransmissions associated with each of a plurality of medium access control for dedicated channel (MAC-d) flows for an EU channel; and
   circuitry configured to transmit performance information to the RNC, the performance information indicating that the maximum number of retransmissions associated with one of the plurality of MAC-d flows is exceeded.

4. The Node B of claim 3 wherein the EU channel is an enhanced dedicated channel (E-DCH) between a wireless transmit/receive unit (WTRU) and the Node B.

5. A method to configure a wireless transmit/receive unit (WTRU) to support enhanced uplink (EU) services, implemented by a WTRU, comprising:
   receiving at least one control signal for configuring the WTRU;
   configuring a maximum number of hybrid automatic repeat request (H-ARQ) transmissions for each of a plurality of medium access control (MAC) for dedicated channel (MAC-d) flows based on the at least one control signal;
   multiplexing at least one of the plurality of MAC-d flows for transmission over an enhanced uplink channel;
   selecting one maximum number of H-ARQ transmissions to use for transmission of the multiplexed MAC-d flows, wherein the one maximum number of H-ARQ transmissions is selected based on the maximum number of H-ARQ transmissions associated with each of the MAC-d flows that are multiplexed;
   transmitting the multiplexed MAC-d flows over the enhanced uplink channel; and
   stopping re-transmission of the multiplexed MAC-d flows on a condition that the one maximum number of H-ARQ transmissions is exceeded.

6. The method of claim 5, further comprising:
   reporting EU traffic statistics, wherein the EU traffic statistics include a volume of EU data;
   receiving a further control signal in response to the reported EU traffic statistics; and
   configuring the WTRU based on the received further control signal.

7. The method of claim 5, further comprising:
   generating periodic channel allocation requests to transmit E-DCH data.

8. The method of claim 5 wherein the at least one control signal includes a maximum allowed transmit power.

9. The method of claim 5 wherein the at least one control signal is received via radio resource control (RRC) signaling.

10. The method of claim 5 wherein the at least one control signal is received from a radio network controller (RNC).

11. The method of claim 5 wherein the maximum number of H-ARQ transmissions for each of the plurality of MAC-d flows is associated with a quality of service (QoS).

12. A wireless transmit/receive unit (WTRU) configured to support enhanced uplink (EU) services comprising:
   circuitry configured to receive at least one control signal for configuring the WTRU;
   circuitry configured to configure a maximum number of hybrid automatic repeat request (H-ARQ) transmissions for each of a plurality of medium access control (MAC) for dedicated channel (MAC-d) flows based on the at least one control signal;
   circuitry configured to multiplex at least one of the plurality of MAC-d flows for transmission over an enhanced uplink channel;
   circuitry configured to select one maximum number of H-ARQ transmissions to use for transmission of the multiplexed MAC-d flows, wherein the one maximum number of H-ARQ transmissions is selected based on the maximum number of H-ARQ transmissions associated with each of the MAC-d flows that are multiplexed;
   circuitry configured to transmit the multiplexed MAC-d flows over the enhanced uplink channel; and
   circuitry configured to stop a re-transmission of the multiplexed MAC-d flows on a condition that the one maximum number of H-ARQ transmissions is exceeded.

13. The WTRU of claim 12, further comprising:
   circuitry configured to report EU traffic statistics, wherein the EU traffic statistics include a volume of EU data;
   circuitry configured to receive a further control signal in response to the reported EU traffic statistics; and
   circuitry configured to configure the WTRU based on the received further control signal.

14. The WTRU of claim 12, further comprising:
   circuitry configured to generate periodic channel allocation requests to transmit E-DCH data.

15. The WTRU of claim 12 wherein the at least one control signal includes a maximum allowed transmit power.

16. The WTRU of claim 12 wherein the at least one control signal is received via radio resource control (RRC) signaling.

17. The WTRU of claim 12 wherein the at least one control signal is received from a radio network controller (RNC).

18. The WTRU of claim 12 wherein the maximum number of H-ARQ transmissions for each of the plurality of MAC-d flows is associated with a quality of service (QoS).

* * * * *